United States Patent [19]
Piazza, deceased

[11] 3,755,285
[45] Aug. 28, 1973

[54] MASS TRANSFER PROCESS

[75] Inventor: Carlo Piazza, deceased, late of Naperville, Ill. by Judith B. Piazza, executrix

[73] Assignee: Standard Oil Company, Chicago, Ill.

[22] Filed: Oct. 1, 1971

[21] Appl. No.: 185,754

[52] U.S. Cl. .............. 260/94.9 F, 23/309, 23/310
[51] Int. Cl. ............................................. C08f 1/88
[58] Field of Search ............... 260/94.9 F; 23/309, 23/310

[56] References Cited
UNITED STATES PATENTS

| | | | |
|---|---|---|---|
| 3,148,069 | 9/1964 | Sjogren et al. | 23/309 |
| 3,074,921 | 1/1963 | Carter | 260/94.9 F |
| 3,272,787 | 9/1966 | Scoggin et al. | 260/94.9 F |
| 2,850,438 | 9/1958 | Bodkin et al. | 23/310 |

Primary Examiner—Joseph L. Schofer
Assistant Examiner—Alan Holler
Attorney—Robert R. Cochran

[57] ABSTRACT

Mass transfer operations between two or more materials which are contacted within a system made up of a combination of selectively arranged sub-contacting units which are so combined as to provide for countercurrent phase contacting while having some cocurrent phase contacting within the combination.

15 Claims, 4 Drawing Figures

INVENTOR.
Carlo Piazza

BY Morando Berrettini

ATTORNEY

MASS TRANSFER PROCESS

DESCRIPTION OF THE INVENTION

This invention relates generally to mass transfer operations between two or more materials and more particularly concerns a process for the continuous solvent extraction of polymers.

There is hardly a chemical process which does not include a mass transfer operation as a material purification step, a product separation step, or a heat transfer step, and the like, as an essential part of the process. Generally such mass transfer operations require the contact of one material with another; the materials being contacted may be gases, liquids, solids or combinations thereof.

The contacting of such materials takes place through the utilization of systems which will be referred to herein as contact units. More specifically contact units as used herein include three basic types which are:

1. countercurrent contacting units where the contacting materials contact one another while moving in opposite directions;
2. cocurrent contacting units where the contacting materials contact one another while moving in the same direction; and
3. batch type contacting units where the materials contact one another as they are mixed in situ by some mixing means.

These basic contacting units have been combined in both parallels and/or series combinations in both pure or mixed forms. A pure combination refers to combining one or more contacting units of the same type whereas a mixed combination refers to combining one or more different types of contacting units. System combinations as used herein, unless otherwise specified, refer to series combinations. In any combination used, however, no system to date has been devised where combined mixed systems have been arranged to provide a flow pattern for the system which, as a whole, will result in a pure flow pattern, i.e., pure countercurrent or pure cocurrent. Such systems would be extremely desirable from both engineering and economic points of view since desirable features of a cocurrent contacting system could be instilled in an overall system which has countercurrent flow characteristics and vice-versa.

OBJECTS

It is the object of my invention to provide a new, versatile and efficient process for conducting mass transfer operations between two or more materials.

It is another object of my invention to provide mass transfer processes having smaller hold-up times and lower investment costs than presently known processes.

It is yet another object of this invention to provide more effective mixing between various materials thus eliminating any system unbalance.

It is another object of my invention to provide a process which will improve mass transfer between the same or different materials.

It is another object of my invention to lower equipment hold-up volumn in countercurrent contacting systems.

It is a more particular object of my invention to provide apparatus in a process which will provide continuous solvent extraction of solid products in reaction mixtures and more specifically polymer solids.

It is further a more specific object of this invention to insure maximum extraction efficiency by providing solid and liquid flow to approach plug flow conditions.

Other objects and advantages of the invention will becom apparent upon reading the following detailed description and upon reference to the drawings in which.

Figure 4:
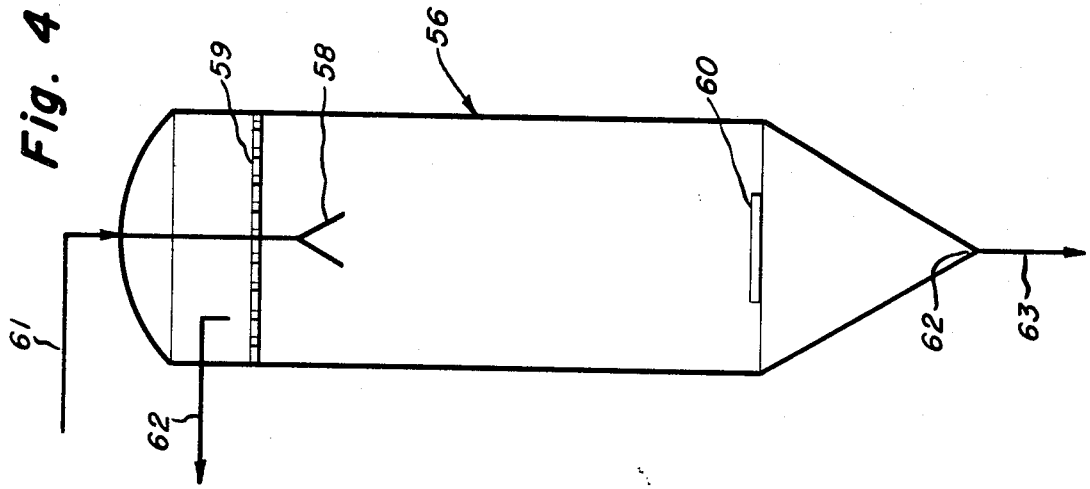
FIG. 4 is a schematic drawing showing a column with certain preferred design features taught by this invention.

While this invention will be described in connection with a preferred embodiment, it will be understood that it is not intended to limit that invention to that embodiment. On the contrary, it is intended to cover all alternatives, modifications and equivalents as may be included within the spirit and scope of this invention as defined by the appended claims.

DETAILED DESCRIPTION OF THE INVENTION

This invention provides a process for mass transfer operations between a first and a second material. The first and second materials are contacted in countercurrent flow patterns in a system made up of a series combination of at least two contact arrangements, although three are preferred. Each of the contact arrangements is made up of a pure countercurrent contacting unit joined to a pure cocurrent contacting unit. The materials are contacted in each contact arrangement in accordance with the steps comprising:

a. passing the first material through the countercurrent unit in a flow direction opposite to the second material;
b. combining the first material exiting from the countercurrent unit with the second material;
c. passing the combined first and second materials through a cocurrent unit which may simply be a pipe connecting joining adjacent countercurrent units; and
d. passing the first material exiting from the cocurrent unit through a subsequently joined contact arrangement.

The first material continues to pass through the joined contact arrangements until it has passed through the final contact arrangement. Upon exiting from the final contact arrangement the first material is separated from the combined first and second materials and collected as the final product.

In such applications as extraction processes the second material is preferably purified and recycled back into the process system by passing it into the countercurrent unit of the last contact arrangement in a flow opposite that of the first material; the second material exiting from the countercurrent unit of the first contact arrangement may similarly be purified and recycled.

The above process can be made to operate more efficiently if, upon exiting from a prior countercurrent unit, the second material given in step (a) is further utilized by passing it to a priorly joined contact arrangement, where it is passed through both the countercurrent unit and the cocurrent unit of that contact arrangement. However, before passing through the cocurrent unit the second material is joined with the first material exiting from the countercurrent unit of that contact arrangement.

The flow through the priorly joined contact arrangement may take place in one of two ways. In one way it is joined with the first material exiting from the countercurrent unit of the priorly joined contact arrangement. The combined first and second materials then pass through the cocurrent unit of that contact arrangement. Upon exiting from the cocurrent unit, the second material is separated from the first material and passed through the countercurrent unit of that arrangement.

In another way, the stream of the second material exiting from the countercurrent unit is split into two streams. One stream is combined in one line with the first material exiting from the countercurrent unit of the priorly joined contact arrangement; the second stream is passed through the countercurrent unit of the contact arrangement.

Figure 1:
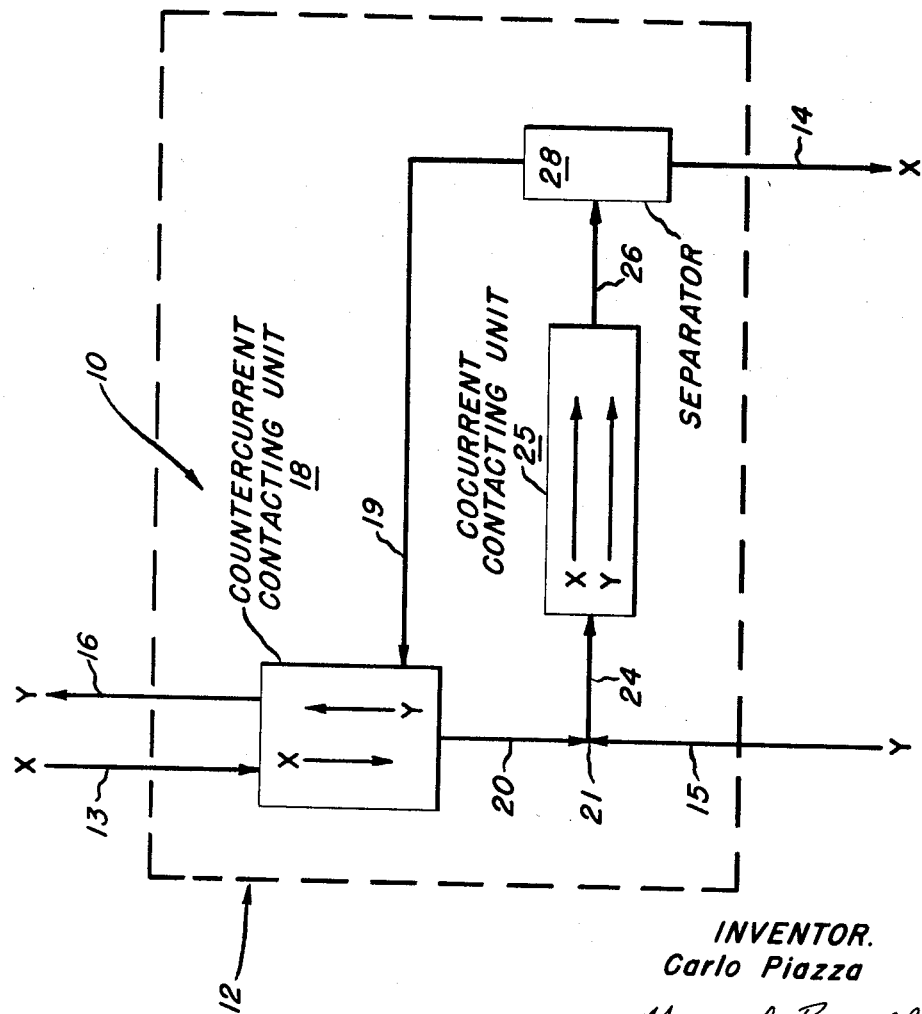
FIG. 1 is a schematic drawing showing a process comprising individual co-flow and counter-flow units combined in a system to provide an overall counterflow contacting pattern.

For purposes of illustration, reference is made to FIG. 1 wherein a countercurrent contacting system 10, made up of a countercurrent unit and a cocurrent unit connected in series, is included within the area defined by dotted line 12 provides for mass transfer operations between materials X and Y which may be gases, liquids, solids or combinations thereof. While two or more systems as defined in FIG. 1 are combined in series in accordance with this invention, a single system is shown to facilitate the flow-patterns of materials X and Y. Taking place in a simultaneous fashion, material X is entering and exiting contacting system 10 through its respective inlet and outlet lines 13 and 14 while material Y is entering and exiting through its respective inlet and outlet lines 15 and 16. Material X, entering the contacting system 10 is made to flow through the countercurrent contacting unit 18 where it flows against material Y entering the unit 18 from the inlet line 19. After flowing through the unit 18, material X passes through the outlet line 20 up to the juncture 21 where it joins material Y flowing to the juncture 21 from the line 15. Materials X and Y then combine and flow cocurrently from the juncture 21 via line 24 to the cocurrent contacting unit 25. Taking the path of least resistance through the line 24, no significant quantities of material X will flow countercurrent to material Y in the line 15; similarly no significant quantities of material Y will flow countercurrent to material X in the line 20. The cocurrently flowing materials X and Y subsequently emerge from the contacting unit 25 by way of the line 26 and are passed to a separator 28 where they are separated and removed therefrom by lines 14 and 19 respectively; material X is removed from the system 10 and material Y removed by way of line 19 from which it is directed to the countercurrent unit 18. Hence, while both countercurrent and cocurrent contacting is taking place within the individual contacting units making up system 10, i.e., units 18 and 25, the overall flow pattern of the system 10 is countercurrent.

As previously mentioned, the process of this invention concerns the series combination of two or more contact arrangements of the type shown in FIG. 1. Such a combination is given in FIG. 2 where three of the systems shown in FIG. 1 are combined to an overall system enveloped by dotted line 31 in which countercurrent contacting of materials X and Y is taking place. The various portions of the process shown in FIG. 2 which are identical to those given in FIG. 1 are identified by the same numbers; however, such numbers are further identified with the letters $a$, $b$ and $c$ to more clearly distinguish the joined individual contact arrangements.

Figure 2:
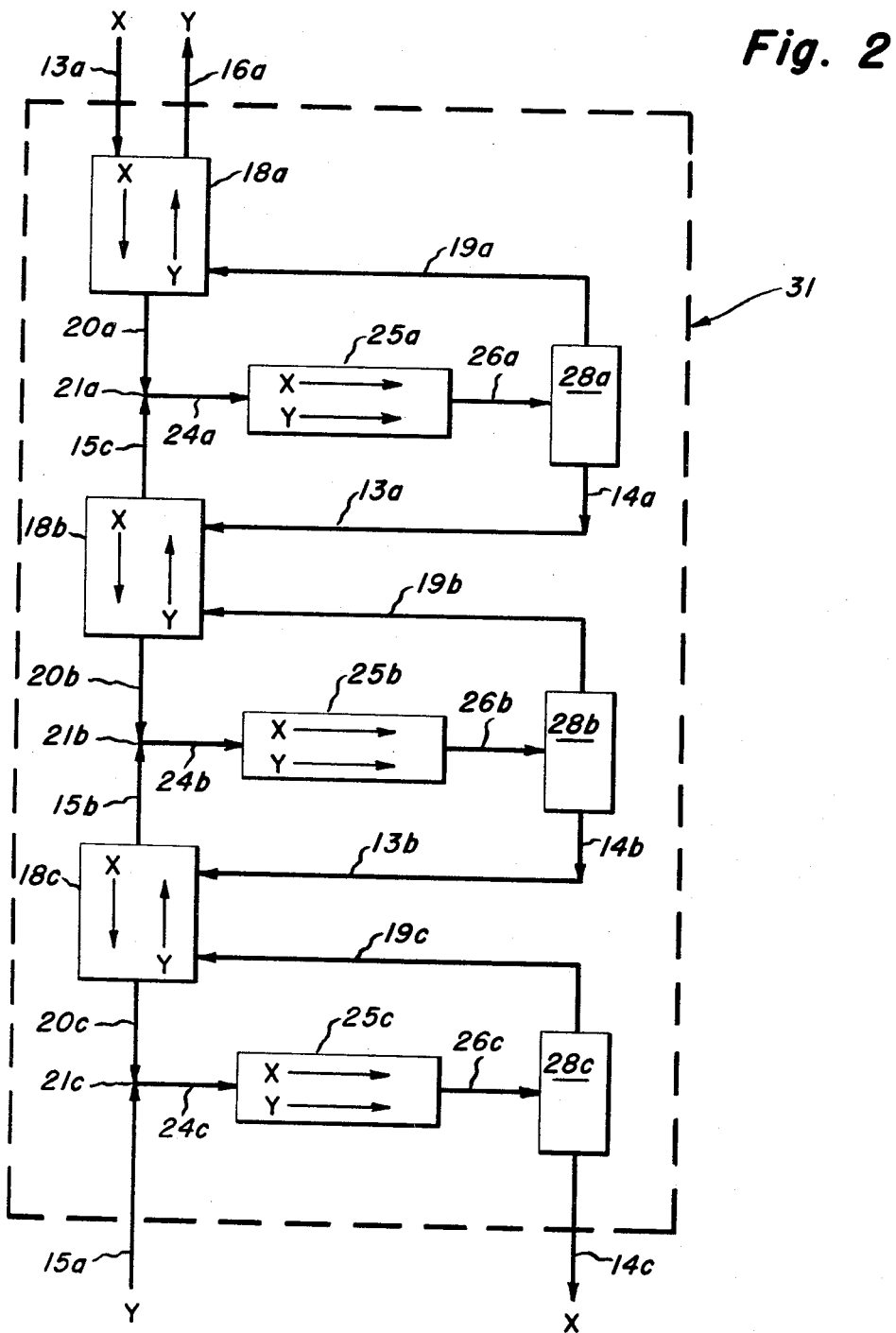
FIG. 2 is a schematic drawing showing a series combination of the process described in FIG. 1.

The process taught by this invention and illustrated in FIG. 2 is particularly well suited for use in solid-liquid extraction operations.

In countercurrent, solid-liquid extraction operations maximum extraction efficiency occurs when both the solid and the liquid flow approach plug flow conditions. Unfortunately, plug flow in countercurrent contacting of solid-liquid phases is difficult to achieve since such operations typically take place in columns. The difficulty arises due to the phenomenon called channeling. This phenomenon results in more liquid flowing through some portions of the countercurrently flowing solids bed than other portions of such beds. Channeling occurs wherever bed porosity is low, such as at the column wall, or where larger than normal particles give increased void volume. Consequently, some solids will pass through the extraction column with less effective contact with the extracting liquid than other solids; such solids will have less extractable material extracted therefrom. Such inadequate extraction can have an adverse effect on the finally extracted solids product when low levels of extractable materials are required.

By utilizing the process taught by this invention, the poor effects resulting from channeling are substantially decreased since any channeling which may occur in a priorly joined countercurrent unit is disrupted by subsequent flow through a cocurrent unit where both solid and liquid phases are well mixed. Therefore, previous unbalance due to channeling that may have occurred in an adjacent countercurrent unit is removed since it is highly improbable that any solid which was by-passed in a first countercurrent will, after redistribution in a joining cocurrent unit, be by-passed in the subsequent countercurrent unit. Hence, in order to provide the referred to redistribution, at least two systems as shown in FIG. 1, must be joined in series so that inadequately contacted solids in a first countercurrent unit may be adequately contacted in a second subsequent countercurrent unit after redistribution in the joining cocurrent unit.

While practically impossible, the most theoretically efficient system from a pure extraction efficiency point of view is one having an infinite number of countercurrent - cocurrent unit combinations. However, from both economical and extraction efficiency points of view, three combinations as shown in FIG. 2 are the most preferred.

Figure 3:
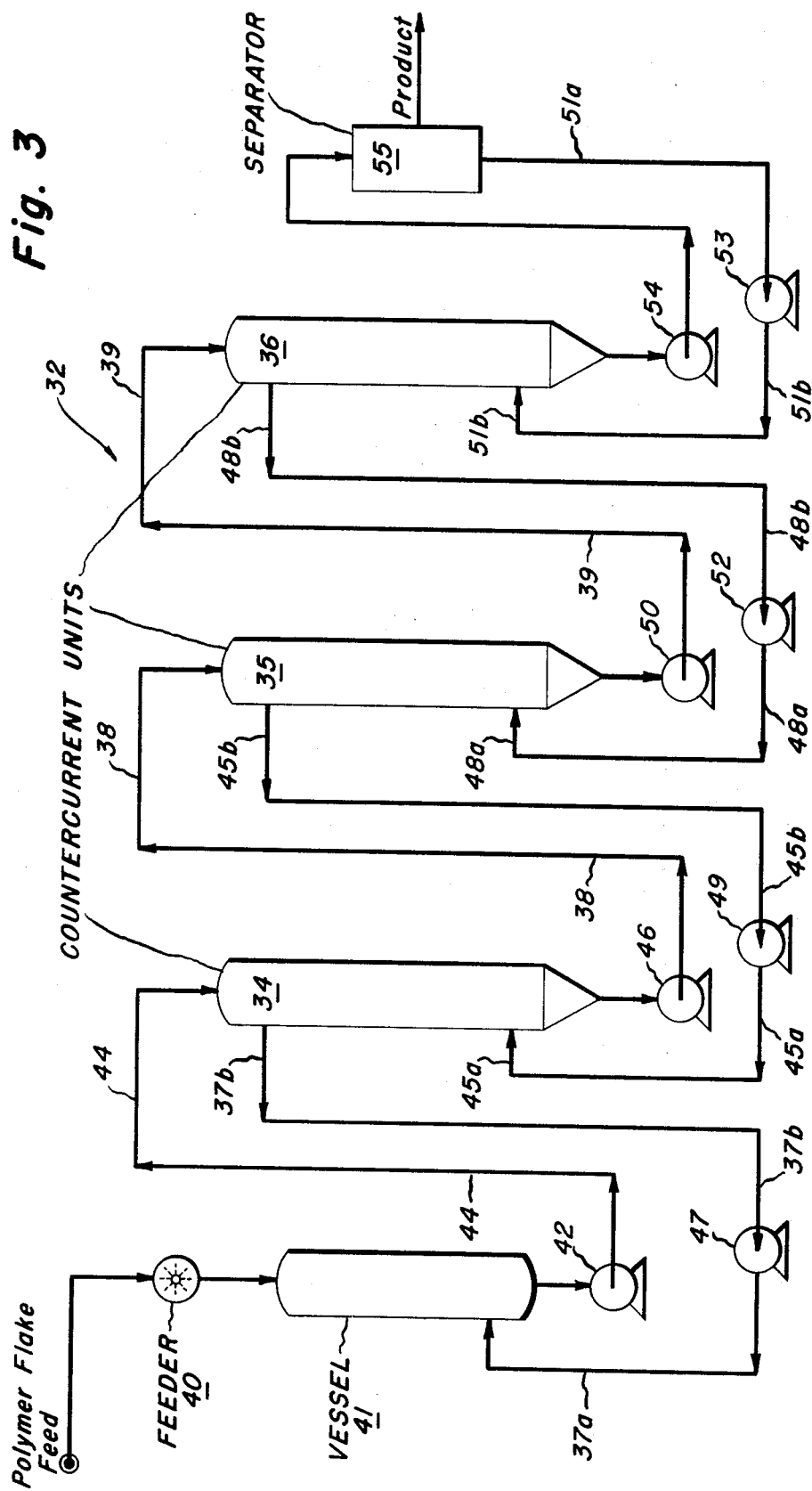
FIG. 3 is a schematic drawing showing the process of this invention as applied to removal of extractable material from a polymer reaction product by solvent extraction.

Turning now to a preferred specific application of the mass transfer process of this invention, FIG. 3 shows a process 32 for the extraction of solids dispersed in a liquid. While such solids could be a variety of materials, polymer solids and more specifically a high density polyethylene flake will be referred to in describing the operation of the process 32. When the polyethylene flake is the solid being extracted in the process 32, the process 32 should preferably be operated under air tight, i.e., air free, conditions to avoid the presence of oxygen. Such air tight conditions may be achieved by operating the process 32 under pressure above atmospheric pressure.

The polyethylene flake contains, as extractable material, polymerization solvent and waxy low molecular weight polymer by-products designated as "grease." It is necessary to displace almost all of the polymerization solvent with a lighter solvent that is easily removable by subsequent drying operations. Further, removal of the grease is desirable for improvement in physical properties of the polyethylene polymer. Normally, the polyethylene flake product is made up of about 40 to about 70 percent by weight pure polyethylene, the remainder being substantially the extractable polymerization solvent and the grease-like materials.

The extraction process 32 consists of the series combination of three countercurrent units 34, 35 and 36. These countercurrent units 34, 35 and 36 are preferably columns and will hereinafter be referred to as such. These columns allow continuous, countercurrent contacting of the extracting solvent and the polymer. While three columns are preferred, two or more than three may also be utilized in the process 32. Connecting the column 34 to column 35 is the line 38 which also acts as a current unit in which phase distribution between the extracting solvent and the solid polyethylene polymer product takes place; similarly line 39, also acting as a cocurrent contacting unit, connects columns 35 and 36.

The total residence time required for the solid polymer product to pass through the three columns 34, 35 and 36 is at least about 2 hours and preferably about 3 to about 6 hours; the extracting temperature within the columns 34, 35 and 36 are about 60° F. to about 200° F. and preferably about 125° F. to about 190° F.; and the extracting solvent mass flow rate is at least about two to about 12 times as great as the mass flow rate of the polyethylene flake product as based on the mass of pure polyethylene.

In describing the process 32, polymer flake is metered by a metering means 40 such as a variable-speed rotary feeder into a vessel 41 where it is immersed and slurried in spent extraction solvent fed to the vessel 41 by way of the line 37a through use of pumping means 47; the extraction solvent being typically normal or branched isomers of hexane or mixtures thereof, hereinafter referred to collectively as hexane, heptane, pentane, cyclohexane and the like. The resulting slurry is then fed to the top of the first extraction column 34 by way of line 44 from the vessel 41 by a metering means 42 such as an eductor using spent extraction solvent as a motive fluid. Simultaneously, extracting solvent is fed to the bottom of the column 34 by way of line 45a. The extracting solvent rising countercurrently up the column 34 is removed at the top thereof through the line 37b and fed by the pumping means 47 to the bottom of the vessel 41 by the line 37a. The solids settle through an interfacial zone of decreasing turbulence and gradually form a dense bed of solids. The solids bed is removed from the column 34 as it reaches the bottom thereof by a pumping means 46 such as an eductor and metered into the top of column 35 by line 38 where as in column 34 the solids settle through an interfacial zone of decreasing turbulence and gradually form a dense bed of solids which moves countercurrent to upwardly rising extraction solvent fed to the bottom of the column 35 by the line 48a. The upwardly rising extracting solvent upon reaching the top of the column 35 is removed therefrom through the line 45b and fed by pumping means 49 to the bottom of column 34 where the extracting solvent starts its upward flow through the column 34.

Returning to the column 35, solids bed upon reaching the bottom of the column 35 is removed by a pumping means 50 such as an eductor and fed into the top of column 36 by way of the line 39 where, as in case of the previous columns 34 and 35, the solids settle through an interfacial zone of decreasing turbulence and gradually form a dense bed of solids which moves countercurrent to upwardly rising extraction solvent fed to the bottom of the column 36 by the line 51b. The upwardly rising extraction solvent, upon reaching the top of the column 36, is removed therefrom through the line 48b and fed by pumping means 52 to the bottom of column 35 where the extracting solvent starts its upward flow through the column 35.

Returning to the column 36, the solids bed upon reaching the bottom of the column 36 is removed by pumping means 54 such as an eductor and fed into a separating means 55, such as a shaker screen by the line 54a, where the solid extracted polyethylene flake product is separated from the extracting solvent on its surface such that a minimum amount of extracting solvent remains on such surface of the polyethylene flake. Preferably the amount of surface located extracting solvent does not exceed about 2 percent by weight of the surface extracting solvent free polyethylene flake weight.

The extraction solvent is removed by the line 51a and is recycled into the process by the pumping means 53 by way of line 51b which leads into the bottom of the column 36.

Fresh extracting solvent should be introduced into the system to replace the extracting solvent lost as a result of normal processing operations. Also, spent extracting solvent should be replaced with fresh solvent after it has been used to the point where it can no longer effectively extract the extractable materials from the polyethylene flake. This will vary with the polyethylene flake content of the extractable material. Of course, a purification step for the extracting solvent could be incorporated into the process 32 and thereby enable prolonged periods of use for the same extracting solvent without the need for replacement thereof.

Once separated from the extracting solvent, the polyethylene flake is subjected to drying operations which can take place by utilizing a variety of means among which include fluid bed dryers, rotary steam tube dryers, rotary tray dryers, flash dryers and the like.

The polymerization solvent content of the extracted polyethylene flake product should not be greater than about 0.4 percent by weight as based on the weight of dry pure polyethylene flake and preferably should be about 0 to about 0.2 percent by weight.

Turning to FIG. 4 there is shown a column 56 containing various preferred design features which can be incorporated in the columns 34, 35 and 36 to provide more effective countercurrent contacting of the materials flowing through the columns.

For example, in order to provide for more rapid settling of the solids into a dense bed of solids, slurry entering the column 56 by line 61 is fed into the top thereof by a distributing means 58 such as a perforated cone. The more rapid settling results are achieved through the use of such a distributing means 58 primarily due to its effect in decreasing turbulence of the slurry flow in the column.

Also, the column 56 could be designed to include a perforated plate 59, located above the distributing means 58. The primary purpose of the plate is to produce an appreciable pressure drop on the upflowing extracting solvent that will effectively impose a flat velocity profile on the liquid stream as well as substantially decrease any overflow of polyethylene fines into the extracting solvent outlet line 62 located above the perforated plate 59. In order to achieve such a profile, the liquid pressure drop through the perforated plate 59 must be at least about the same order of magnitude as the pressure drop through the moving bed in column 56.

Further, in order to prevent more rapid flow of solids down the axis of the column 56 as compared to its periphery, a deflecting means 60 such as a circular plate having a diameter less than that of the column is located above the opening 62 for the exit 63 and thereby causing the solids to flow around its surface.

Thus, it is apparent there has been provided in accordance with the invention, a process that fully satisfies the objects, aims and advantages set forth above. While the invention has been described in conjunction with specific embodiments thereof, it is evident that the many alternatives, modifications and variations will be apparent to those skilled in the art in light of the foregoing description. Accordingly, it is intended to embrace all such alternatives, modifications and variations as may be within the spirit and scope of the appended claims.

I claim:

1. A process for mass transfer operations between a first and a second material where said materials are contacted in countercurrent flow patterns in a system made up of a series combination of at least two contact arrangements each of said arrangements being made up of a pure countercurrent contacting unit joined to a pure cocurrent contacting unit where the materials are contacted in each contact arrangement in accordance with the steps comprising:
    a. passing the first material through the countercurrent unit in a flow direction opposite to the second material, said second material exiting from a subsequently joined cocurrent unit;
    b. combining the first material exiting from the countercurrent unit with the second material exiting from a subsequently joined contact arrangement;
    c. passing the combined first and second materials through a cocurrent unit; and
    d. passing the first material exiting from the cocurrent unit through a subsequently joined contact arrangement;

where the first material continues to pass through the subsequently joined contact arrangements until it has passed through the final contact arrangement wherefrom the first material is separated from the combined first and second materials and recovered as the final product.

2. The process of claim 1 where the number of contact arrangements joined in series is three.

3. The process of claim 1 where the second material exiting from the countercurrent unit in step (a) is further utilized by passing it into a priorly joined contact arrangment where it is passed through both the countercurrent unit and the cocurrent unit thereof, said second material first passing through the cocurrent unit after it has combined with the first material exiting from the countercurrent unit of said priorly joined contact arrangement.

4. The process of claim 3 where the number of contact arrangements joined in series is three.

5. A process for the continuous solvent extraction of solids containing extractable materials where said solids are contacted by a countercurrent flowing extracting solvent in a system made up of a series combination of at least two contact arrangments each of said arrangement being made up of a pure countercurrent contact unit joined to a pure concurrent contacting unit where the solids are contacted in each arrangement in accordance with the steps comprising:
    a. passing the solids through the countercurrent unit in a flow direction opposite to the extracting solvent, said extracting solvent exiting from a subsequently joined cocurrent unit;
    b. combining the solids material exiting from the countercurrent unit with extracting solvent exiting from a subsequently joined contact arrangement;
    c. passing the combined solids and extracting solvent through a cocurrent unit; and
    d. passing the solids material exiting from the cocurrent unit through a subsequently joined contact arrangement;

where, after the separation, the solids material continues to be passed through subsequently joined contact arrangments until it has passed through the final contact arrangement wherefrom the solids material is separated from the combined solids material and extracting solvent and recovered as extractable-material-free final product.

6. The process of claim 5 where the number of contact arrangements joined in series is three.

7. The process of claim 5 where the solids material is a high density polyethylene containing as extractable materials polymerization solvent utilized in the polymerization reaction producing the polyethylene and waxy low molecular weight polymer by-products of the same reaction.

8. The process of claim 7 where the extracting solvent is selected from the group consisting of hexane, heptane, pentane and cyclohexane.

9. The process of claim 8 where the system extracting temperature is maintained within the range of about 60° F. to about 200° F. under air free conditions and the extracting solvent mass flow rate is at least about two to about 12 times as great as the mass flow rate of the polyethylene based on the mass of pure polyethylene.

10. The process of claim 9 where the number of contact arrangements joined in series is three.

11. The process of claim 10 where the total residence time required for the solids to pass through the three countercurrent contact units is at least about 2 hours.

12. The process of claim 11 where the total residence time is about 3 to about 6 hours.

13. The process of claim 11 where the extracting solvent exiting from the countercurrent unit in step (a) is further utilized by passing it into a priorly joined contact arrangement where it is passed through both the countercurrent unit and the cocurrent unit, said extracting solvent first passing through the cocurrent unit after it has combined with the solids material exiting from the countercurrent unit of said priorly joined contact arrangement.

14. The process of claim 5 where the countercurrent contacting units are columns having solids inlets and extracting solvent outlets at their top and solids outlet and extraction solvent inlets at their bottom.

15. The process of claim 14 where the columns are provided with solids distributing means at the top of the columns to distribute solids fed to the columns so that they more rapidly settle into a dense bed of solids, a perforated plate located above the distributing means sufficient to produce an appreciable pressure drop and thereby impose a flat velocity profile on the upflowing extracting solvent, and a solids flow deflecting means located above the outlet of the columns, said deflecting means preventing the more rapid flow of solids down the axis of the column as compared to its periphery.

* * * * *